United States Patent [19]

Uchida

[11] Patent Number: 4,584,846
[45] Date of Patent: Apr. 29, 1986

[54] AIR CONDITIONER ASSEMBLY FOR USE IN A VEHICLE

[75] Inventor: Goro Uchida, Toyota, Japan

[73] Assignee: Toyota Jidosha Kabushiki Kaisha, Aichi, Japan

[21] Appl. No.: 705,531

[22] Filed: Feb. 26, 1985

[30] Foreign Application Priority Data

May 29, 1984 [JP] Japan .................... 59-079016[U]

[51] Int. Cl.$^4$ ............................................. B60H 1/32
[52] U.S. Cl. ........................................ 62/244; 98/2.06
[58] Field of Search ............... 62/239, 244; 98/2.08, 98/2.11, 2.06; 165/41, 42

[56] References Cited

U.S. PATENT DOCUMENTS 4,412,425  11/1983  Fukami et al. .................. 62/244

FOREIGN PATENT DOCUMENTS 59-079016  5/1984  Japan .

Primary Examiner—Lloyd L. King
Attorney, Agent, or Firm—Parkhurst & Oliff

[57] ABSTRACT

An air conditioner for use in a vehicle includes a housing having air inlet and outlet openings. Air is introduced into the housing through the air inlet openings and processed air is ultimately ventilated out of at least one air outlet opening. An air fan is provided to be in communication with the air inlet openings and is located in the housing. The air fan blows intaken air toward a heating means which subsequently warms the air. The assembly further includes an air damper which controls the amount of air which is forced through the heating means. Additionally, a cool air duct having inlet and outlet openings is provided in the assembly such that the inlet opening of the duct is located upstream from the heating means. Thus, air entering the cool air inlet opening bypasses the heating means and never mixes with warm air from the heating means, resulting in this air being ventilated through the outlet openings as cold air. The warm air ventilated through the outlet openings is directed toward a lower body portion of the passenger, while the cool air ventilated through the outlet openings is directed toward an upper body portion of a passenger.

20 Claims, 8 Drawing Figures

AIR CONDITIONER ASSEMBLY FOR USE IN A VEHICLE

BACKGROUND OF THE INVENTION

The present invention relates generally to an air conditioner assembly for use in a vehicle, and more particularly to a compact air conditioner which ventilates cold air toward a passenger's upper body portion and warm air toward passenger's lower body portion, and provides for a larger space in the passenger compartment by occupying a smaller area therein.

An example of a known air conditioner assembly is disclosed in Japanese Utility Model Sho No. 52-9704, which is shown in FIG. 7. According to this known structure, fresh and recirculated air can be supplied toward a passenger as cool air or heated air. Fresh air is introduced into the air conditioner assembly through a fresh air duct 28a and recirculated air can be similarly introduced into the air conditioner through a recirculated air duct 28b. The introduced air is directed toward the evaporator 6 by means of an air fan 5. Some of the air passing through the evaporator 6 is directed toward a heating means 2, which subsequently warms the air passing through it. The warm air is ventilated toward the passenger compartment through a warm air outlet 19. An air inlet opening 12a is provided between the evaporator 6 and the heating means 2. This air inlet opening 12a communicates between the assembly housing and the cool air duct 11'. The opening and closing of the air inlet 12a is controlled by a cool air damper 13b. When the cool air damper 13b opens as shown is FIG. 7, some of the air directed from the evaporator 6, instead of flowing toward the heating means as described above, flows through the cool air inlet opening 12a into the cool air duct 11' and is ventilated out as cold air toward the passenger compartment through a cold air outlet 17a. Thus, the air conditioner assembly provides a means for ventilating warm air through the warm air outlet 19 toward a lower portion of the passenger compartment and cold air through the cold air outlet 17a toward an upper portion of the passenger compartment. Thus, the passenger receives cold air around his upper body portion and warm air around his lower body portion.

However, the above-described air conditioner assembly has a significant drawback. When a damper 13b is in its open position, as shown in FIG. 7, a portion of the heater is not used effectively for heating. In other words, when the cool air damper 13b is in its closed position, air passing through the evaporator 6 can communicate freely with the upstream face of the heating means 2. However, when the cool air damper 13b is opened, a portion of the upstream face of the heating means 2 is effectively blocked off from the flow of air. Thus, a portion of the heater is not utilized for heating air, thus making the assembly inefficient. Further, as shown in FIG. 7, the cool air duct 11' protrudes into the passenger compartment, at least by the width L. Thus, the assembly unnecessarily occupies space in the passenger compartment.

FIG. 8 shows another known air conditioner assembly. This air conditioner also consists of a housing with inlet and outlet openings. An evaporator 6 is provided nearest to the inlet opening. A heating means 2 is mounted so that its downstream face forms an acute angle with an inner wall surface of the housing and is positioned adjacent to a concave portion 200, formed within the housing. An air damper 4 selectively opens and closes a space 3 formed between the heating means 2 and an upper inner wall surface of the housing. When the air damper 4 is in an open position, corresponding to the two-dot chain line which is parallel to the upstream face of the heating means, air which has passed through the evaporator 6 completely bypasses the heating means 2 and is ventilated as cool air through air outlets 17 and/or 18. Further, when the air damper 4 is closed completely, corresponding to the two-dot chain line position vertically above the air damper 4, air is forced through the heating means 2 exclusively, and is ventilated out as warm air. However, no provision is made in the assembly for the simultaneous supply of cool air and warmed air, but only for air of a single temperature. Additionally, FIG. 8 shows that a concave portion 200 is essentially dead space in the passenger compartment and is not put to beneficial use.

SUMMARY OF THE INVENTION

The present invention was made in view of the foregoing background and to overcome the foregoing drawbacks. It is accordingly an object of this invention to provide a compact and efficient air conditioner assembly for use in a vehicle, thus improving the performance and providing for a greater space in the passenger compartment.

To attain the above objects, an air conditioner according to the present invention, comprises a housing including air inlet and outlet openings. Air is introduced into the housing through the air inlet opening and processed air is ultimately ventilated out of at least one air outlet opening. An air fan is provided to be in communication with the air inlet opening and is located in the housing. The air fan blows the intaken air toward a heating means which subsequently warms the air. The assembly further includes an air damper which controls the amount of air which is forced through the heating means 2. Additionally, a cool air duct having inlet and outlet openings is provided in the assembly such that the inlet opening of the duct is located upstream from the heating means. Thus, air entering the cool air inlet opening bypasses the heating means and never mixes with warm air from the heating means resulting in this air being ventilated through the outlet opening as cold air.

BRIEF DESCRIPTION OF THE DRAWINGS

The above objects, features and advantages of the present invention will become more apparent from the following description of the preferred embodiments taken in conjunction with the accompanying drawings. It should be noted that these embodiments are purely illustrative of, and not intended to limit the present invention, wherein.

DETAILED DESCRIPTION OF THE PREFERRED EMBODIMENTS

The present invention is described in detail with reference to the accompanying drawings which illustrate different embodiments of the present invention.

Figure 1:
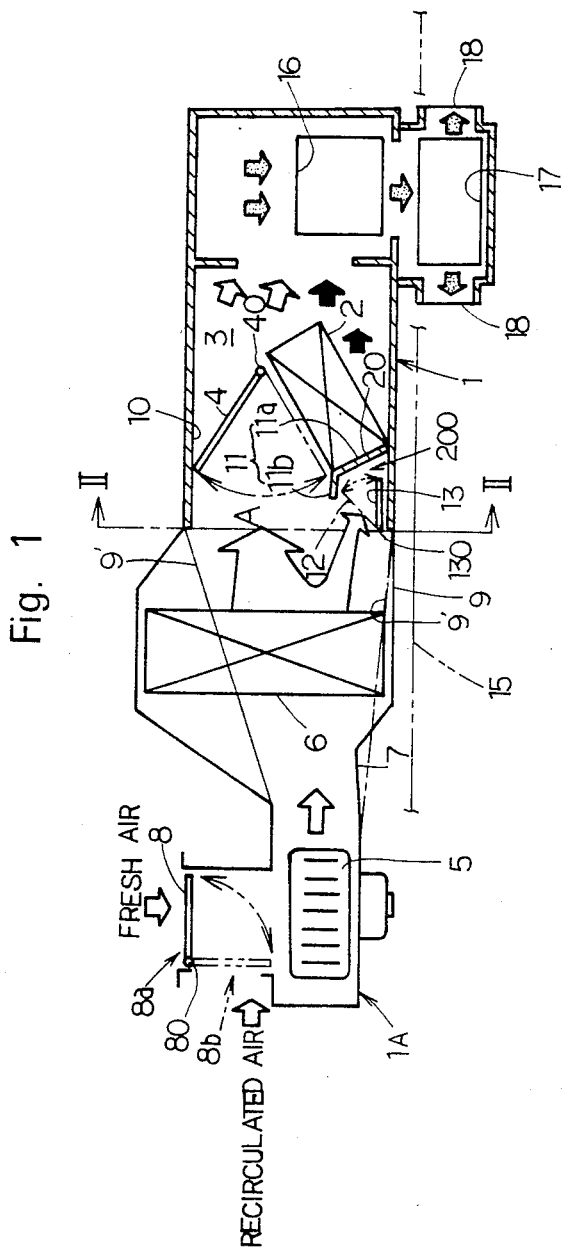
FIG. 1 is a general view of an air conditioner according to a first embodiment of the present invention.
Figure 2:
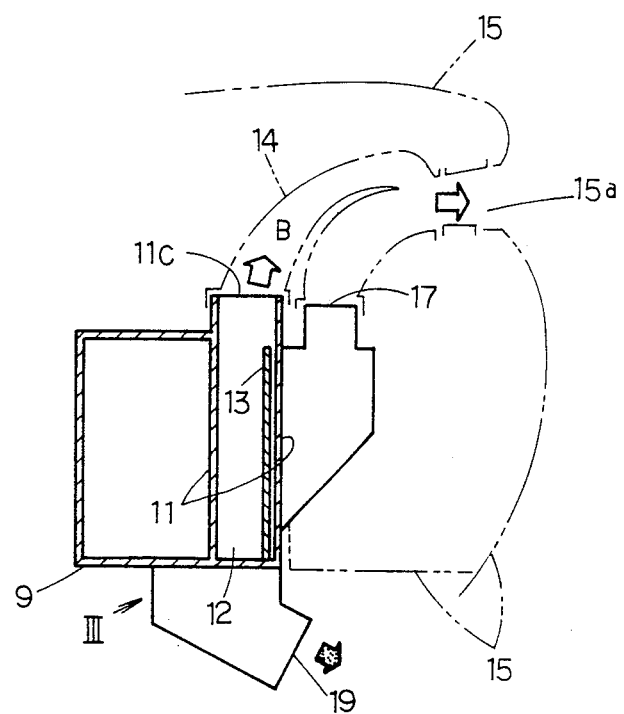
FIG. 2 is a cross-sectional view taken along the line II—II in FIG. 1.
Figure 3:
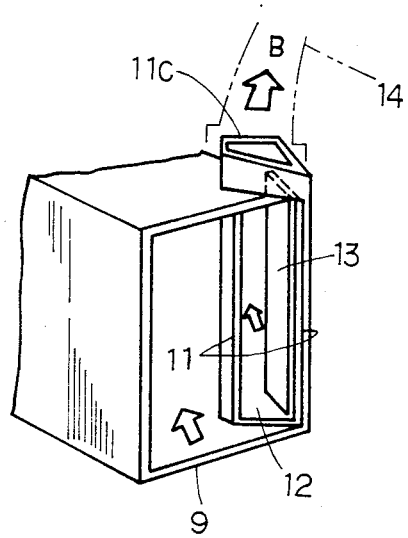
FIG. 3 is a partial perspective view of an air conditioner which is viewed from the direction indicated by the reference III in FIG. 2.

FIGS. 1 to 3 illustrate an air conditioner according to a first embodiment of the present invention. FIG. 1 shows a general view of the air conditioner assembly. The assembly includes a housing having three general sections. A first section 1A includes a fresh air inlet opening 8a and a recirculated air inlet opening 8b. An air damper 8 can be rotated about an axis 80 to open selectively either of the inlet openings 8a and 8b, while simultaneously closing the other. An air fan 5 is also provided in the first section and is positioned below the inlet openings and is in communication therewith.

The second section 7, as shown in FIG. 1, is in communication with a downstream end of the first section 1A and an upstream end of the third section 1. The second section 7 functions as a cooling unit, and as shown in FIG. 1, can include an evaporator 6 therein. In this embodiment the outer surfaces of the second section 7 are represented by the line 9. If the evaporator 6 is not provided within the second section 7, then the outer surfaces of the second section 7 are represented by dotted lines 9'.

The third section 1 functions as a heating unit and includes air inlet and outlet openings. The air inlet opening of the third section 1 is in communication with the downstream end of the second section 7 and the outlet opening forms the defroster outlet opening 16 of the assembly. The defroster outlet opening 16 communicates with a central vent 17 and side vents 18 through which the warm air is ventilated out of the air conditioner assembly. Another vent 19 is provided at a lower portion of the passenger compartment and is designed to ventilate warm air toward the passenger's lower body as shown in FIG. 2.

Figure 7:
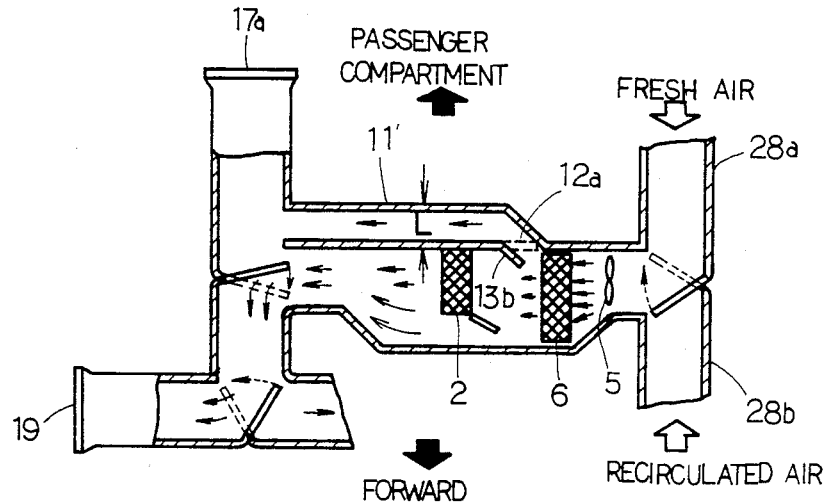
FIG. 7 is a general view of a known air conditioner assembly.
Figure 8:
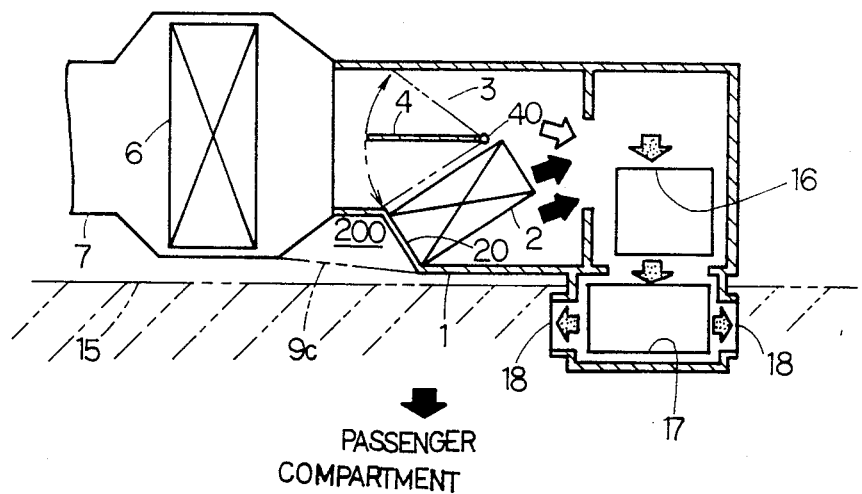
FIG. 8 is a general view of another known air conditioner assembly.

The third section 1 includes a rectangular-shaped heating means 2, which is mounted on a lower portion of an inner wall 10 of the housing comprising the third section, so as to form an acute angle between the inner wall 10 and a downstream surface of the heating means, as well as forming an acute angle between an upstream surface of the heating means with respect to air flowing from the air fan 5. A tubular cold air bypass duct 11 is also provided in the third section and extends in a direction substantially perpendicular to the longitudinal direction of the air conditioner assembly. The duct 11 comprises two portions, a portion 11a extending along a side portion 20 of the heating means 2 and a portion 11b which extends substantially parallel to the inner wall 10 of the third section 1. A cold air inlet opening 12 is provided in the duct 11, through which cold air can bypass the heating means 2 and be ventilated out through a cold air outlet opening 11c. Thus, cold air in the duct 11 does not mix with any warm air from the heating means 2. The outlet opening 11c communicates with a duct 14 and a vent 15a, the vent 15a being defined within an instrument panel 15 of the vehicle, as shown in FIGS. 2 and 3. The cold air which bypasses the heater and enters the duct 11 through the cold air inlet opening 12 is ventilated through the vent 15a toward a passenger's upper body. The cold air inlet opening 11 is provided with a cool air damper 13, which is mounted on an axis 130 and is rotatable there about. The axis 130 is located adjacent to the lower inner wall 10 of the second section 7 and upstream from the heating means 2. Thus, when the cool air damper is opened, air can flow into and through the duct 11. However, even when the air damper 13 is open, the flow of air to an air entrance side of the heating means is not prohibited from contacting any portion of the air entrance side of the heating means. Thus, the prior art problem of the cool air damper blocking off a portion of the upstream face of the heating means has been obviated. This is a significant improvement over prior art assemblies. Further, the dead space 200, shown in FIG. 8, has been converted into an inlet opening for the cold air duct 11. Thus, the air conditioner assembly according to the present invention overcomes the problems of the prior art depicted in FIG. 7, by utilizing a previously unused dead space 200, shown in FIG. 8.

A warm air damper 4 is mounted on an axis 40 and is designed to be rotatable around it. The warm air damper 4 is similar to the damper 4 shown in FIG. 8. The warm air damper 4 selectively changes the amount of air which is forced through the heating means 2. By directing a large amount of air to flow through the heating means 2, corresponding to the position shown in FIG. 1, substantially all of the air which does not enter the cool air duct 11 is warmed by the heating means 2. Conversely, when the damper 4 is positioned so that it is parallel to the upstream face of the heating means 2, as represented by the two-dot chain line in FIG. 1, substantially all of the air bypasses the heating means 2. The warm air damper 4 can be located at a plurality of portions intermediate to the two extreme positions depicted in FIG. 1, resulting in various temperatures of warm air ventilated through the outlet openings 17 and/of 18.

Figure 4:
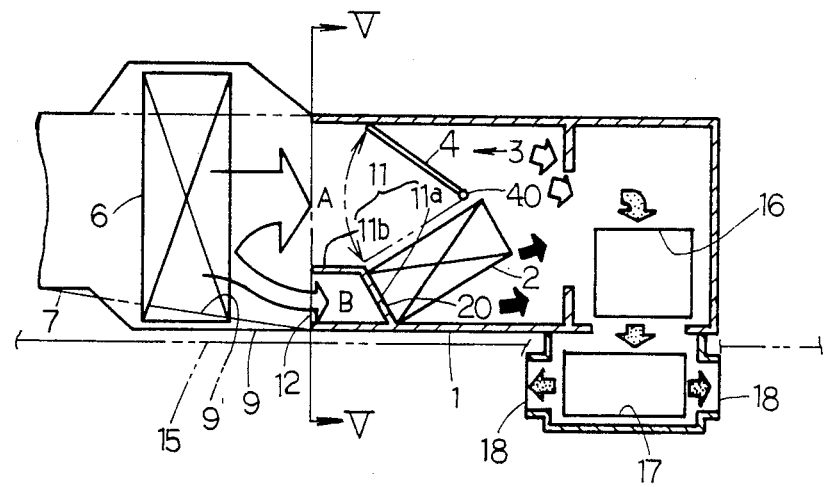
FIG. 4 is a general view of an air conditioner according to a second embodiment of the present invention.
Figure 5:
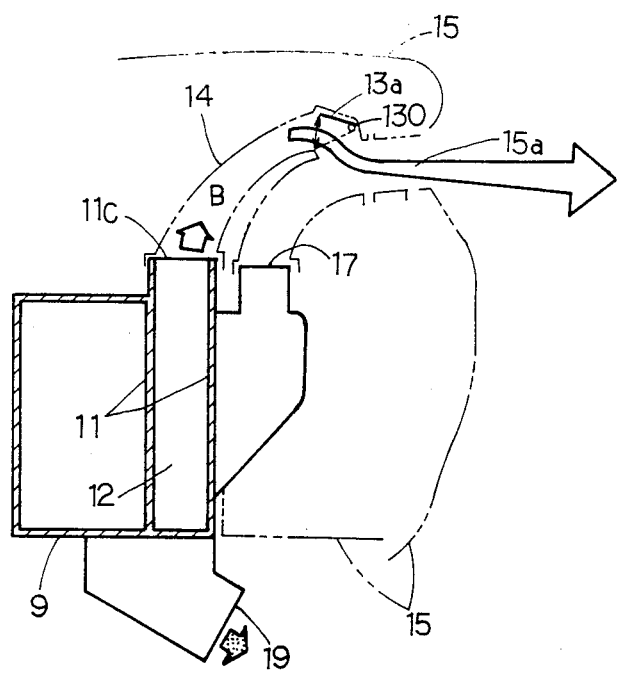
FIG. 5 is a cross-sectional view taken along the line V—V in FIG. 4.
Figure 6:
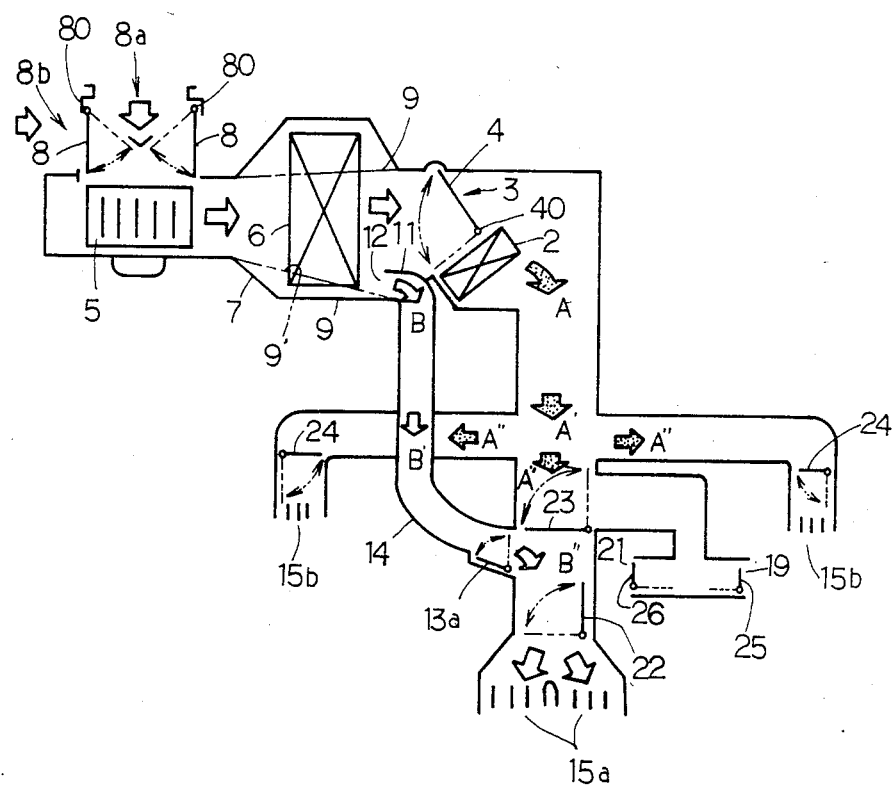
FIG. 6 is a general view of an air conditioner according to a second embodiment, which has different air flow passages therein.

FIGS. 4 to 6 show an air conditioner assembly according to a second embodiment of the present invention. The difference between the air conditioners of the first and second embodiments is that according to the second embodiment, the cool air damper 13a is not provided at a position adjacent to the cool air inlet 12 as shown in FIGS. 1, 2 and 3, but rather at a position nearer to a central vent 15a, within a duct 14. This assembly permits a reduction in size of certain parts of the air conditioner assembly, such as cables, vacuum hoses, and links, which are provided to actuate the cold air damper 13a. In all other respects, the second embodiment is substantially identical with the first embodiment. Thus, only the points of difference will be described below.

FIG. 6 shows a general view of the air conditioner according to the second embodiment, wherein air flow passages, which are different from those disclosed in FIGS. 1-5, are utilized. In FIG. 6, the intaken air passes through sections 1A and 7 similar to the first embodiment, however when the cool air damper 13a and the central vent switching dampers 22 and 23 rotate from the positions indicated by dotted lines to those positions indicated by solid lines, to place the vent switching damper 22 in an open position and the vent switching damper 23 is in a closed position, air that passes through the evaporator 6 is introduced into the cold air duct 14, which is upstream from the heating means 2, through the duct 11. Thus, the air that enters the cold air duct 14 bypasses the heating means 2. This bypassed cold air then flows in the directions indicated by the references B, B' and B" within the cold air duct 14 and is ventilated out, through the central vent 15a.

However when warm air damper 4, vent switching dampers 23 and cool air damper 13a are in the closed position, air flows through the heating means 2 and in the direction indicated by arrows A, A' and A" and is ventilated out of the assembly. A pair of side vents 15b, through which warm air can be ventilated toward the side portion of the passenger compartment, are also provided. The openings of the side vents 15b are controlled by side vent dampers 24. A defroster opening 21 and a heater outlet 19 are provided below the vent switching damper 23. The opening and closing of the defroster opening 21 is controlled by a defroster damper 26 and the opening and closing of the heater outlet 19 is controlled by a heater damper 25. A central vent 15a, similar to that of the first embodiment, is also provided. Warm air from the heating means 2 is ultimately ventilated through the central vent 15a, side vents 15b, defroster opening 21 and heater outlet 19. Hence, the passenger can receive warm air on his lower body portion and cool air on his upper body portion.

Further, the air conditioner assembly according to the present invention may be assembled in a vehicle as stated above without the evaporator and only with a heating means.

While the present invention has been described in its preferred embodiments, it is to be understood that the invention is not limited thereto, and may be otherwise embodied within the scope of the following claims.

What is claimed is:

1. An air conditioner assembly for use in a vehicle comprising:
    a housing including a plurality of sections;
    at least one air inlet opening which permits air to be introduced into the housing;
    at least two air outlet openings which permit air to flow from the housing and into a passenger compartment of the vehicle, a first of said at least two outlet openings functioning to direct air into a lower portion of said passenger compartment, a second of said at least two outlet openings functioning to direct air into an upper portion of said passenger compartment;
    an air supplying means for drawing air through said at least one air inlet opening and forcing air upstream and out through said at least two outlet openings;
    a heating means for warming air forced therethrough by said air supplying means, said heating means being located within said housing and having an upstream face and a downstream face, an air passage being defined between said heating means and said housing;
    a first air damping means located within said air passage, said first air damping means including a hinge and a plate, said plate including a first end and a second end, said hinge being located at one end of the upstream face of said heating means, said hinge being connected to said housing and being connected to said first end of said plate, whereby said plate is pivotally movable between a first position in which said plate is parallel to said upstream face of said heating means and a second position in which said second end of said plate is in contact with said housing, whereby when said plate is in said first position said air forced upstream by said air supplying means is prevented from entering said heating means and is forced to pass through said air passage, and when the plate is in said second position said air forced upstream by said air supply means is prevented from passing through said air passage and is forced to pass through said heating means, and when the plate is positioned at an intermediate position between said first and said second position, a part of the air is introduced into said heating means and a part of the air passes through said air passage; and
    a cool air duct having an inlet opening and being in communication with said second outlet opening, said inlet opening being located in said housing upstream from said upstream face of the heating means, said inlet opening not blocking any portion of said upstream face of the heating means when said plate of said first air damping means is in said first position, whereby air passing through said heating means is ventilated out through said first outlet opening and air passing through said cool air duct is ventilated out through said second outlet opening.

2. The air conditioner assembly of claim 1, further comprising a second air damping means located at the inlet opening of said cool air duct.

3. The air conditioner assembly of claim 1, further comprising a second air dampening means located within said cool air duct between said inlet opening and said second outlet opening.

4. The air conditioner assembly of claim 1, further comprising an evaporator located between the air supplying means and the heating means.

5. The air conditioner assembly of claim 1, wherein said at least one inlet opening includes a first inlet opening for fresh air and a second inlet opening for recirculated air.

6. The air conditioner assembly of claim 1, wherein said first and second outlet openings are provided in an instrument panel in the vehicle.

7. An air conditioner assembly for use in a vehicle comprising:
    a housing including a plurality of sections;
    at least one air inlet opening which permits air to be introduced into said housing;
    at least two air outlet openings which permit air to flow from the housing and into the vehicle;
    an air supplying means for drawing air through said at least one air inlet opening and forcing air out through said at least two air outlet openings;
    a heating means for warming air forced therethrough by said air supplying means, said heating means being located within said housing and having an upstream face and a downstream face, an air passage being defined between said heating means and said housing;
    a first air damping means for controlling an amount of air which flows into said heating means; and
    said first air damping means being located within said air passage, said first air damping means adapted to be selectively positioned between a first position and a second position, in said first position said first air damping means preventing said air drawn through said at least one air inlet opening from flowing into said heating means, in said second position, said first air damping means preventing said air drawn through said at least one air inlet opening from passing through said air passage; and a cool air duct having an inlet opening, said cool air duct being in communication with a second of said at least two outlet openings, said inlet opening being located upstream in said housing from said upstream face of the heating means and downstream in said housing from said air supplying means, said inlet opening not blocking any portion of said upstream face of the heating means when air enters the inlet opening, whereby when said air damping means is in said second position air passing through said heating means is ventilated out through a first of said at least two opening outlet openings toward a lower portion of a passenger compartment in said vehicle and air passing through said cool air duct is ventilated out through a second of said at least two outlet openings toward an upper body portion of a passenger compartment in said vehicle.

8. The air conditioner assembly of claim 8, further comprising a second air damping means located at the outlet opening of said cool air duct.

9. The air conditioner assembly of claim 7, further comprising a second air damping means located within said cool air duct between said inlet opening and said second outlet opening.

10. The air conditioner assembly of claim 7, further comprising an evaporator located between the air supplying means and the heating means.

11. The air conditioner assembly of claim 7, wherein said at least one inlet opening comprises a first inlet opening for fresh air and a second inlet opening for recirculated air.

12. The air conditioner assembly of claim 7, wherein said first and second outlet openings are located in an instrument panel in the vehicle.

13. An air conditioner assembly for use in a vehicle comprising:
a housing including a plurality of sections;
at least one air inlet opening which permits air to be introduced into the housing;
at least two air outlet openings which permit air to flow from the housing and into the vehicle;
an air supplying means for drawing air through said at least one air inlet opening and forcing air out through said at least two outlet openings;
a heating means for warming air forced therethrough by said air supplying means, said heating means being located within said housing and having an upstream face and a downstream face, an air passage being defined between said heating means and said housing;
a first air damping means for controlling an amount of air which can pass through said heating means; and
said first air damping means being located within said air passage, said air damping means being selectively positioned between a first position and a second position, in the first position, said air damping means preventing the air from entering said heating means, in the second position, said air damping means preventing the air from passing through said air passage;

an air shutting means for preventing air passing through said heating means from being ventilated out through a first one of said at least two air outlet openings of said housing, said air shutting means being located at an upstream side from said first one of said at least two air outlet openings of said housing; and a cool air duct having an inlet opening, said cool air duct being in communication with a first of said at least two outlet openings, said inlet opening being located upstream in said housing from said first air damping means and downstream in said housing from said air supplying means, said inlet opening not blocking any portion of said upstream face of the heating means when air enters the inlet opening, whereby when said air damping means is in said second position air passing through said heating means is ventilated out through a second of said at least two outlet openings toward a lower portion of a passenger compartment and air passing through said cool air duct is ventilated out through said first of said at least two air outlet opening toward an upper body portion of a passenger compartment in said vehicle.

14. The air conditioner assembly of claim 13, further comprising a second air damping means located at the inlet opening of said cool air duct.

15. The air conditioner assembly of claim 13, further comprising a second air damping means located within said cool air duct between said inlet opening of said cool air duct and said first outlet opening.

16. The air conditioner assembly of claim 13, further comprising an evaporator located between the air supplying means and the heating means.

17. The air conditioner assembly of claim 13, wherein said at least one inlet opening comprises a first inlet opening for fresh air and a second inlet opening for recirculated air.

18. The air conditioner assembly of claim 13, wherein said first and second outlet openings are located in an instrument panel in the vehicle.

19. The air conditioner assembly of claim 1, further comprising an air shutting means for preventing air passing through said heating means from being ventilated out through said second air outlet opening of said housing, said air shutting means being located at an upstream side from said second air outlet opening of said housing.

20. The air conditioner assembly of claim 7, further comprising an air shutting means for preventing air passing through said heating means from being ventilated out through second outlet opening of said housing, said air shutting means being located at an upstream side from said second outlet opening of said housing.

* * * * *